United States Patent [19]
Weis et al.

[11] Patent Number: 5,621,895
[45] Date of Patent: Apr. 15, 1997

[54] FRAME-STRUCTURED BUS SYSTEM FOR TRANSMITTING BOTH SYNCHRONOUS AND ASYNCHRONOUS DATA OVER A STAR-COUPLED LOCAL OPERATION NETWORK

[75] Inventors: Bernd X. Weis, Korntal; Anke Schmietainski, Hemmingen; Heinz Schlesinger, Mundelsheim, all of Germany

[73] Assignee: Alcatel Sel Aktiengesellschaft, Stuttgart, Germany

[21] Appl. No.: 566,741

[22] Filed: Dec. 4, 1995

Related U.S. Application Data

[63] Continuation of Ser. No. 92,159, Jul. 15, 1993, abandoned.

[30]  Foreign Application Priority Data

Jul. 23, 1992 [DE] Germany ............................ 42 24 339.4

[51] Int. Cl.⁶ .................................................. G06F 13/00
[52] U.S. Cl. ...................... 395/200.17; 370/407
[58] Field of Search ...................... 395/200.02, 200.05, 395/200.13, 200.17, 200.21, 840, 853, 309, 311, 550, 800; 370/85.1, 85.13, 85.14, 85.15, 94.1, 94.3, 124, 82–84; 340/825.5; 371/8.2, 11.2, 20.1

[56] References Cited

U.S. PATENT DOCUMENTS

| | | | |
|---|---|---|---|
| 4,502,137 | 2/1985 | Tan | 370/85.7 |
| 4,726,018 | 2/1988 | Bux et al. | 370/85.5 |
| 4,780,869 | 10/1988 | Engdahl et al. | 370/16 |
| 4,998,247 | 3/1991 | Irvine-Halliday et al. | 370/94.1 |
| 5,041,963 | 8/1991 | Ebersole et al. | 395/200.2 |
| 5,079,738 | 1/1992 | Bockenfeld | 395/800 |
| 5,386,542 | 1/1995 | Brann et al. | 395/550 |

*Primary Examiner*—Alpesh M. Shah
*Attorney, Agent, or Firm*—Robbins, Berliner & Carson, LLP

[57]  ABSTRACT

A frame-structured bus system, particularly for a local operation network for automotive applications, is disclosed in which a plurality of bus stations share a data bus, and in which one of the bus stations generates a sequence of data frames of constant bit length. Each data frame includes an isochronous frame module and an asynchronous frame module, and the division of each data frame into the isochronous and asynchronous frame modules is dynamically variable. The message transmitted by a station is passed through a central star coupler to all stations. A frame clock is generated by a frame clock generator and sent to the central star coupler, with the time sequence of the data frames of the frame clock defining a reference frame clock, and the other stations of the local operation network determining an individual frame transmit clock, such that the respective message transmitted by a particular station, taking into account the propagation delay to the central star coupler, arrives at the central star coupler at that instant relative to the reference frame clock at which this message has to be inserted into the data frame present in the central star coupler.

20 Claims, 4 Drawing Sheets

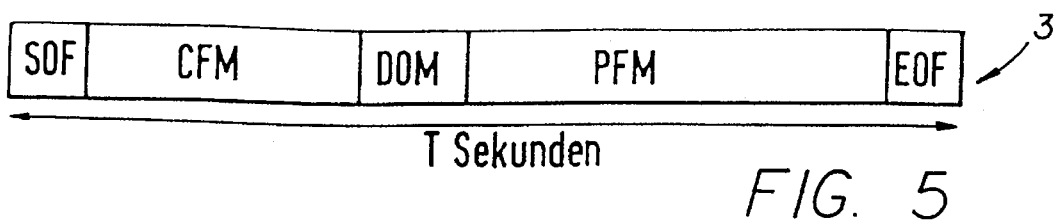
FIG. 5
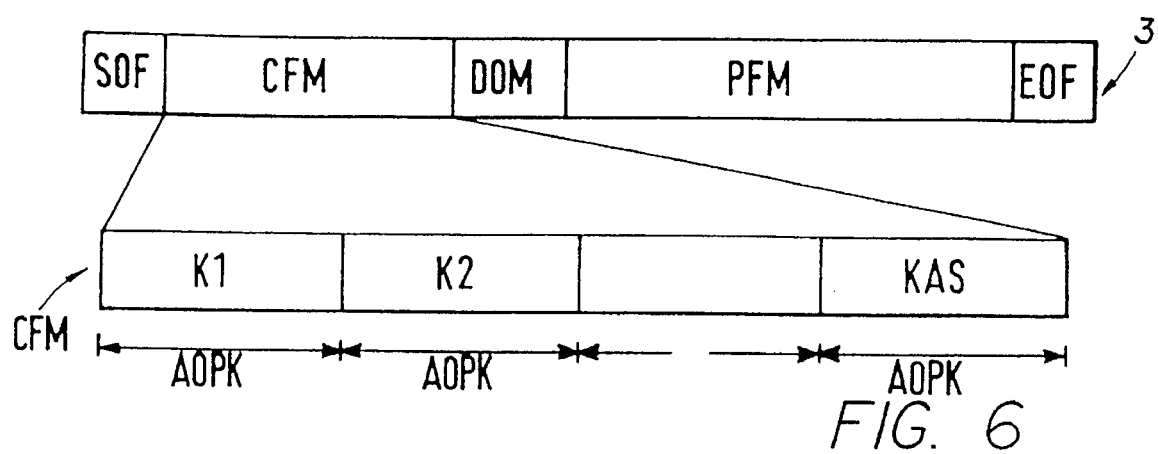
FIG. 6
FIG. 7
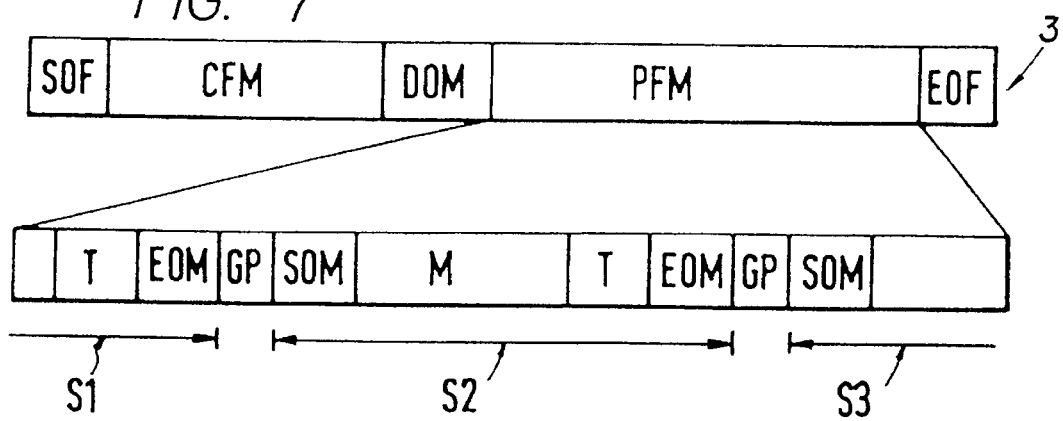
FIG. 8
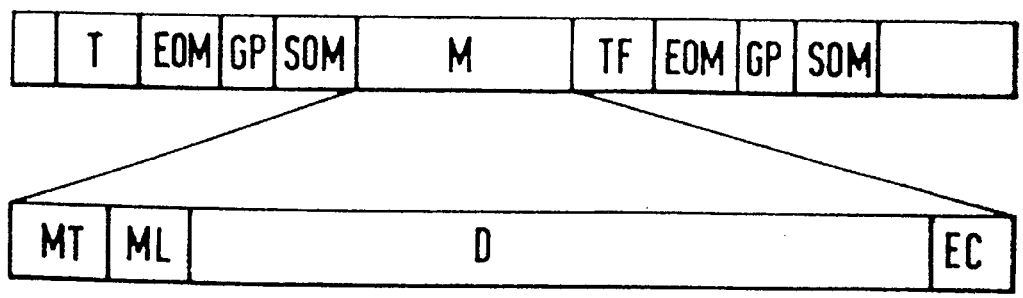

FRAME-STRUCTURED BUS SYSTEM FOR TRANSMITTING BOTH SYNCHRONOUS AND ASYNCHRONOUS DATA OVER A STAR-COUPLED LOCAL OPERATION NETWORK

This is a continuation of Ser. No. 08/092,159, filed Jul. 15, 1993, now abandoned.

TECHNICAL FIELD

The present invention relates to a frame-structured bus system for a star-coupled local operation network.

BACKGROUND ART

A bus system for a local operation network for automotive applications is disclosed in DE-OS 35 06 118. The asynchronous bus access method used there is carrier sense multiple access with collision detection (CSMA/CD), wherein contention between two or more subscribers is resolved by an arbitration mechanism at bit level.

In the CSMA/CD method, each bus station having data to be transmitted places its data on the bus if the bus is not currently being used by any other station (carrier sense). If two bus stations, taking account of signal propagation delays, transmit quasi-simultaneously, collisions will occur which must be detected by the stations by listening to the bus. These stations then take appropriate steps to eliminate the collision. This has the disadvantage that all transmitted data are lost, so that the bus stations must transmit their data anew. Another disadvantage of such an asynchronous CSMA/CD method is that the transmission of a given bit rate for a given bus station cannot be guaranteed.

Also known is an asynchronous token access method, in which access to the data bus is controlled by a token representing an access authorization. Only that bus station may place data on the bus which is in possession of the token. The single token of the system is passed from bus station to bus station, with appropriate steps having to be initiated if the token is lost or is multiplied by a faulty operation in the bus system. This asynchronous token bus method has the disadvantage that it can guarantee only limitedly the transmission of a given bit rate for a given station.

Frame-structured bus systems are known which have synchronous bus access mechanisms, whose organization is essentially channel-oriented: One bus station generates data frames of equal bit length which each have a plurality of time slots. Each of the other bus stations is assigned one time slot during which it can insert data into the data frame. The constancy of the frame length and the predetermined division of the time slots within a data frame ensure that each of the stations can transmit a defined, predetermined bit rate. A disadvantage of this rigid frame and time-slot structure is that such a synchronous access mechanism is of only low efficiency if the amounts of data to be transmitted by the bus stations vary widely. This situation occurs, for example, in a local operation network for automotive applications, where audio and/or video data are fed from a bus station into the operation network: During the operating time, high data rates are constantly present on the data bus of the operation network, while no data have to be transmitted when the audio/video set is off. The fixed structure of the time slots within a predetermined data structure then results in the time slots assigned to the audio/video bus station remaining unused outside the operating time of the radio. Due to this insufficient utilization of transmission capacity, the efficiency of the frame-structured bus system is drastically reduced.

The known prior art bus systems have the disadvantage of being not flexible enough to meet the increased requirements in the automotive field. In a modern local operation network for automotive applications, not only the standard data accruing in each automobile for ensuring the functionality of the auto and for monitoring and controlling functional groups are to be transmitted. To meet customers' wishes, every major automobile manufacturer offers a number of extras. Therefore, apart from the standard data, a number of further data have to be transmitted through the local operation network which are necessary to control the extras or accrue during operation of this additional equipment. When equipping an automobile with such extras, the problem arises that in different models, these extras have to be mounted in different places. As a result, propagation delays between these stations and the central star coupler vary from model to model. The prior art bus system for an automotive local operation network does not allow these different, model-dependent propagation delays to be taken into account. Therefore, its field of use is greatly limited, so that it is not universally applicable.

Also, during integration of the different extras in the single operation network, the problem arises that for the joint transmission of signals typically occurring in automobiles and of signals of the extra equipment (e.g., electronic on-board office), synchronous and asynchronous data have to be switched jointly, with the data rates varying from a few bauds to several Mbauds. To reach synchronism in the network, it is then also necessary to compensate for differences in propagation delay.

Furthermore, in a fiber-optic local operation network, the problem arises that transmission times change as a result of the natural aging of the glass fibers used. The prior art bus system for the prior art local operation network cannot take this into account, either.

DISCLOSURE OF INVENTION

In accordance with one aspect of the invention, a frame clock generator transmits a frame clock determined by a sequence of data frames of a defined bit length, that said frame clock is passed to the central star coupler, the time sequence of the data frames of the frame clock defines a reference frame clock governing the signal processing of the stations of the local operation network, each of the stations of the local operation network determines an individual frame transmit clock, such that the respective message transmitted by a particular station, taking into account the propagation delay from the sending station to the central star coupler, arrives at the latter at a defined instant relative to the reference frame clock, at which said message must be incorporated into the data frame present in the central star coupler, and the data frame containing the messages of the stations is sent to all stations. Thus, the individual stations of the local operation network may determine the time of transmission of their messages to the central star coupler by taking into account the propagation delay from the sending station to the central star coupler. This measure ensures in a particularly advantageous manner that the messages from the sending stations arrive at the central star coupler precisely at the time they can be inserted into the data frame without complication. Another advantage is that the determination of the propagation delay between sending station and central star coupler is made individually for each station, so that any change of the transmission path is dynamically measurable. This individual, dynamic propagation-delay compensation has the advantage that the bus system is flexible with regard to the arrangement of the stations in the local operation network, which results in universal applicability. Another advantage of the individual and dynamic propagation-delay compensation is that aging phenomena of the transmission links can be easily compensated for. A further advantage is that the frame transmit clock of the individual stations is referred to a central reference frame clock which is preferably generated by a station acting as a "master station". This measure makes it possible to define a reference clock for the whole local operation network in a particularly simple manner.

In accordance with another aspect of the invention, the function of the frame clock generator is performed by a station of the bus system. Preferably, in addition to this "master station", at least one further station of the local operation network is equipped with hardware to be able to subsidiarily perform the function of the frame clock generator. To this end, this subsidiary "master station" transmits a frame clock identification if it does not receive a frame clock from the primary "master station" within a given time interval from the activation of the bus system. Preferably, however, all stations of the local operation network are capable of performing the function of the primary "master station". Through this measure according to the invention, increased system reliability is achieved in a particularly advantageous manner.

In accordance with yet another advantageous aspect of the invention, to compensate for propagation delays and, thus, to determine its frame transmit clock relative to its frame receive clock, each station sends out a test sequence and determines the time which elapses until its reception. This permits a particularly simple determination of the propagation delay, from which the frame transmit clock can then be easily determined.

According to a still further advantageous aspect of the invention, after turn-on of the supply voltage, each station of the local operation network performs a self-test to ascertain whether all components are operating properly. This measure ensures in an advantageous manner that only fully functional stations are taking part in the communication over the bus system of the local operation network.

According to a further advantageous aspect of the invention, the data frames contain a synchronous frame module, which transmits synchronous services, and an asynchronous frame module, which transmits asynchronous services. This hybrid data-frame structure makes it possible to transmit both synchronous and asynchronous services within a single data frame of the bus system in a particularly advantageous manner, whereby the universal range of application of the bus system is further extended.

In accordance with another aspect of the invention, the division of each of the data frames of the frame-structured bus system into the isochronous and asynchronous frame modules is dynamically variable. The bus system is thus particularly flexible with regard to the number and characteristics of the individual bus stations of the system, since the latter can be expanded by adding both bus stations which access the data bus of the frame structured bus system isochronously and stations which access the bus asynchronously. Through the dynamic variability of the current shares of the isochronous and asynchronous frame modules in the transmission capacity of the data frame, efficient adaptation of this available transmission capacity to the current volume of isochronous and asynchronous services is achieved in a particularly simple manner.

According to a further advantageous aspect of the invention, the respective current division of the data frame into the isochronous and asynchronous frame modules is effected by a division module which separates these two frame modules. The division module, which is dynamically shiftable within each data frame, is represented by a defined bit combination of a given length which is determined via asynchronous signalling procedures. These measures make it possible in a particularly simple manner to fix the current shares of the isochronous and asynchronous frame modules individually for each data frame.

According to a still further advantageous aspect of the invention, the length in bits of the isochronous frame module, which is variable from data frame to data frame, is an integral multiple of a basic channel. Through these measures, it is then easily possible to ensure the isochronous transmission of different bit rates for each individual bus station in a particularly advantageous manner by concatenating a plurality of basic channels.

According to a further advantageous aspect of the invention, stations of the local operation network are connected to the central star coupler via a secondary star coupler. This measure has the advantage of drastically reducing the number of transmission lines required.

According to a further advantageous aspect of the invention, at least one station of the local operation network is implemented as a multiplexer/demultiplexer. This allows a plurality of information sources and/or sinks connected to this station to be combined in a single modular unit.

BRIEF DESCRIPTION OF DRAWINGS

Further details of the invention will become apparent by reference to the following description of an embodiment of the invention taken in conjunction with the accompanying drawings, in which:

FIG. 5 shows an embodiment of a modular data frame;

FIG. 6 shows an isochronous frame module;

FIG. 7 shows an asynchronous frame module;

FIG. 8 shows a message module and

BEST MODE FOR CARRYING OUT THE INVENTION

Figure 1:
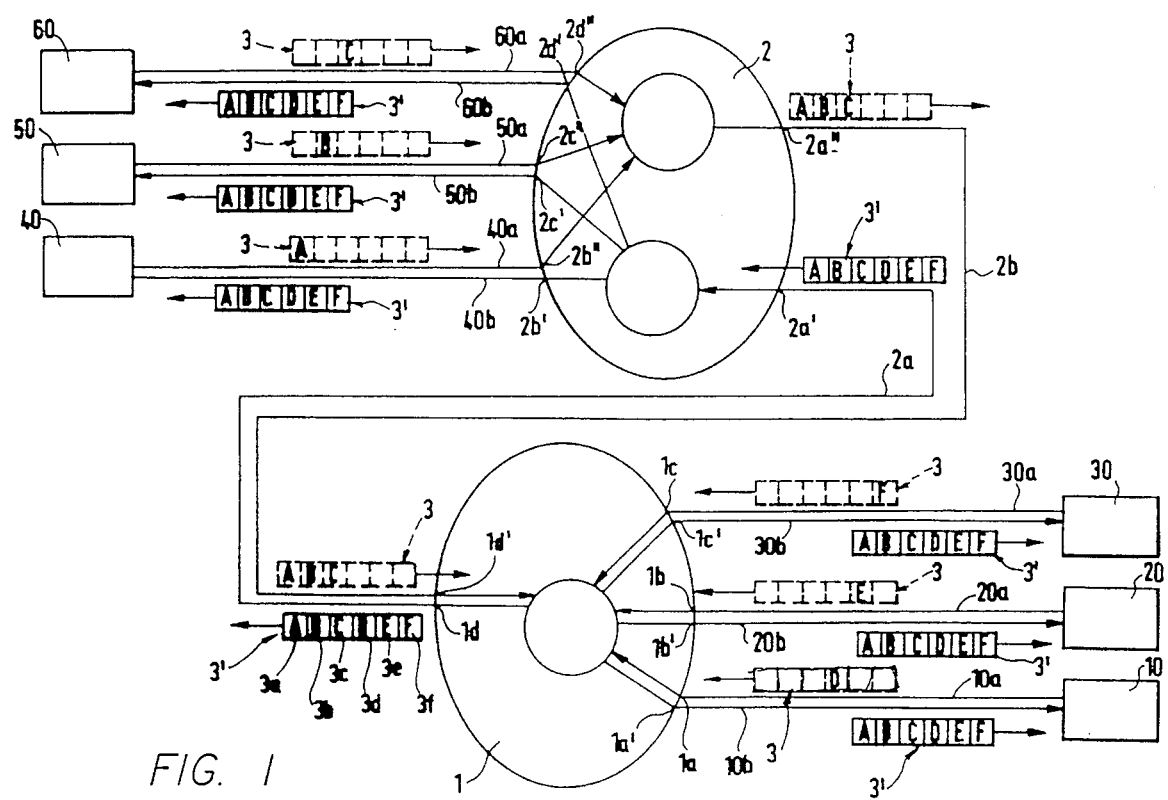
FIG. 1 shows an embodiment of a local operation network.

The embodiment of a local operation network shown in FIG. 1 includes a central optical star coupler 1 to which three stations 10, 20, and 30 are connected via glass fibers 10a, 10b, 20a, 20b, and 30a, 30b acting as bus lines. Also connected to the central optical star coupler 1, via additional glass fibers 2a, 2b, is a secondary optical star coupler 2 which, in turn, is connected via glass fibers 40a, 40b, 50a, 50b, and 60a, 60b to three stations 40, 50, and 60 of the local operation network.

The central star coupler 1 is designed to distribute an optical signal appearing at one of its inputs 1a–1d to all outputs 1a'–1d'. For example, the optical signal transmitted from the first station 10 over the glass fiber 10a to the input 1a will be passed both to the output 1a' which is correlated with the input 1a, and to the other outputs 1b'–1d'. The same applies analogously to the second and third stations 20 and 30 and to the secondary star coupler 2.

The secondary star coupler 2, unlike the central star coupler 1, is designed to pass a signal appearing at any of its inputs 2a'–2d' to the output 2d'', i.e., to the output connected to the central star coupler 1.

Analogously, a signal appearing at the output 1d' of the central star coupler 1 and transmitted over the glass fiber 2a to the input 2a' of the secondary star coupler 2 will be passed to the outputs 2b''–2d'', which are coupled to the stations 40–60 of the local operation network.

The design of the central star coupler 1, which is implemented as an active or passive optical star, and of the secondary star coupler 2 is apparent to those skilled in the art from the above functional description, so that no further explanations are necessary.

The stations 10–60 connected to the central star coupler 1 and to the secondary star coupler 2 serve to adapt arbitrary electrical and/or logic conditions of the information sources and/or sinks (not shown in FIG. 1) connected to these stations to the fiber-optic local operation network. Depending on the intended use of these stations of the local operation network, different designs of the stations are possible. The below-described design of the individual stations 10–60 is only exemplary, and it is to be understood that the function assigned to a particular station is not intended to limit the generality of the statements made.

The first station 10 is designed as a universal interface which serves to provide the connection between arbitrary digital or analog sensors/actuators (not shown) on the one hand and arbitrary other information sources or sinks of the local operation network. It thus converts the sensor-specific signals generated by the sensors into optical data signals, which can propagate in the local operation network. On the other hand, the first station 10 also serves to convert the optical data signals transmitted to it through the optical fibers of the local operation network into specific actuator signals. Thus, with a first station 10 designed as a universal interface, it is readily possible to couple existing sensor/actuator modules to the local operation network without specific adaptation of these modules.

The other stations 20–60 are designed as specific interfaces which are optimally adapted for a specific application. The second station 20 is designed as a CAN interface and serves to integrate an external CAN bus. Within this external CAN bus, the second station 20 acts like a CAN station having equal access capability, and within this CAN island formed by the CAN bus system, it acts as the receiving station, which after arrival of a CAN bus signal enters an acknowledge field into the CAN bus protocol. Within the optical bus system, it acts as a transmitter, i.e., the second station 20 can pass signals received via the bus system to the stations of its CAN island.

The second station 20, which acts as a CAN interface, is designed to process all signals made available to it by the CAN island or the fiber-optic local operation network. The second station 20 is thus in a position to incorporate existing sensors/actuators based on the ISO Standard CAN into the local operation network in a particularly simple manner.

The third station 30 is designed as a FIFO interface and serves as a data collection unit which can receive and buffer externally entered information and transmit this information serially over the fiber-optic network.

The fourth station 40 receives audio/video signals via an antenna input (not shown in FIG. 1) and converts them into optical data signals, which can propagate in the fiber-optic local operation network. In addition, it serves to convert the optical data signals received by it from the glass fibers of the local operation network into a form in which they are processible by the audio/video terminals (not shown) connected to this fourth station 40. Since the optical data signals fed by a station into the local operation network are transmitted to all other stations, the fourth station 40 includes devices which enable it to process data signals which are supplied from other stations and are of importance for audio/video purposes, and to use these data signals for controlling enhanced-feature functions of the audio/video terminals, such as speed-dependent volume control of a car radio, into which enters the travelling speed of the car as a control quantity for raising or lowering the loudness level.

The fifth station 50 acts as a communications interface which converts mobile radio signals (GSM, DCS 1800, DECT) received by it via an antenna input (not shown in FIG. 1) into the signal format of the local operation network and reconverts the optical data signals transmitted by this network into signals significant for the terminals connected to it.

The sixth station 60 is designed as an instrument interface. It permits the connection of a central display unit (not shown) and makes available all necessary sensor signals for display.

It is also possible, however, to provide for a coupling and/or combination of the functions of the above-described stations 10–60 in a single functional unit.

The design of the above stations, which is tailored to the specific field of application, allows a particularly low-cost implementation of the stations of the local operation network.

The design of the stations 10–60 of the local operation network is also dependent on whether only a single terminal is to be incorporated into the local operation network or whether a plurality of terminals is to be coupled to the local operation network via a particular station 10–60. In the former case, it is sufficient to design the station 10–60 so that it permits the conversion of the terminal-specific signals into the data format of the local operation network and vice versa, as described.

If two or more terminals are to be coupled to the local operation network, it is advantageous to design the subscriber 10–60 as a multiplexer/demultiplexer which, using a conventional multiplexing technique, suitably conditions the terminal signals to be fed into the local operation network, and demultiplexes the optical data signals received by the particular station from the local operation network into the terminal-specific signals. In a preferred embodiment, the station 10–60 of the local operation network permits internal communication between the terminals connected to it, so that a modular structure is achieved.

The basic operation of the bus system for the local operation network will also be described with reference to FIG. 1. Details of the operation will then be explained with the aid of the other figures.

Figure 3:
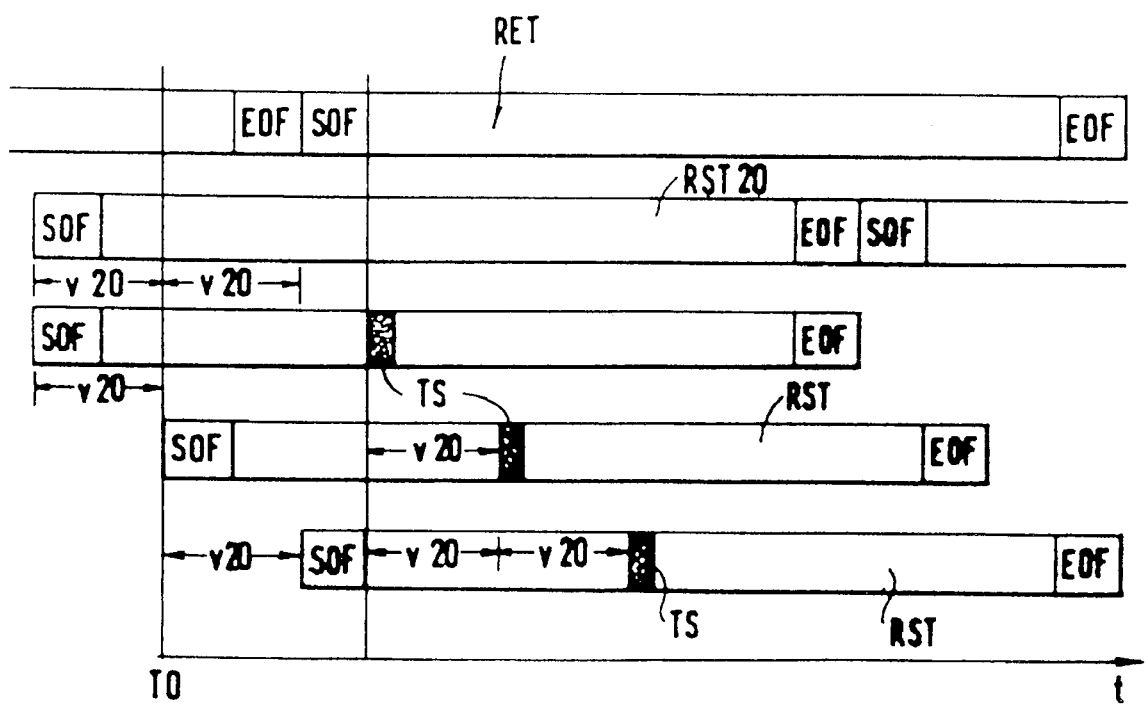
FIG. 3 is a schematic representation of the determination of the propagation delays.

One station of the local operation network—here the first station 10, as assumed above—acts as a frame clock generator and generates a sequence of data frames 3 of fixed bit length, which determine this frame clock. These data frames 3 are transmitted over the glass fiber 10a to the input 1a of the central star coupler 1. In the central star coupler 1, the messages from all stations 10–60 of the local operation network are combined in the data frame 3. This requires that the data from each of the stations 10–60 arrive at the central star coupler precisely on time, i.e., at the time they are to be inserted into the data frame 3. For this frame reference clock, the time-slot pattern is chosen which is determined by the arrival at the central star coupler 1 of the data frames generated by the first station 10. All other stations 20–60 adapt their signal processing to the reference frame clock to ensure that their messages arrive at the central star coupler 1 on time (see above), taking into account the propagation delays from the respective station 20–60 to the central star coupler. This is done as follows:

The first station 10, acting as the frame clock generator, generates a data frame 3 of a defined bit length which is identified and delimited by frame mark bits SOF and EOF (see FIG. 3). The data frame 3 generated at the time T0–v10 arrives at the central star coupler 1 at the time T0. The variable v10 denotes the propagation delay between the first station 10 and the central star coupler 1. At the same time, the first station 10 inserts its message D into the data frame 3, assuming that this station 10 is assigned a fourth segment 3d of the data frame 3, which is divided into six segments 3a–3f. The division of the data frame 3 into six segments 3a–3f is not necessarily physical in nature. This kind of division was chosen only for simplicity and conciseness of description so as to be able to more easily identify the relative position of the message D to be inserted into the data frame 3. The fact that an explicit frame structure is transmitted from the first station 10 to the central star coupler 1 is indicated in FIG. 1 by the fact that the data frame 3 transmitted from the first station 10 to the central star coupler 1 is represented by continuous lines.

The frame mark bit SOF, which indicates the beginning of a data frame 3, reaches the central star coupler 1 after a propagation delay of v10. This instant T0—the arrival of the frame mark bit SOF of the data frame 3 generated by the first station 10—is defined as a reference time for the signal processing in the local operation network. The same applies analogously to the data frames following the data frames 3, so that the frame clock generated by the first station 10 and determined by the sequence of data frames 3 defines a reference frame clock of the bus system of the local operation network.

To ensure that the messages transmitted by the other stations 20–60 of the local operation network arrive at the central star coupler 1 at the proper time, taking into account the propagation delays from the respective station to the central star coupler, a frame transmit clock controlling the transmit-side signal processing of the individual stations 20–60 must be synchronized with the reference frame clock. In the following description of the this synchronization, it is assumed for simplicity that a fifth segment 3e of the data frame 3 is assigned to the second station 20, a sixth segment 3f to the third station 20, a first segment 3a to the fourth station 40, a second segment 3b to the fifth station 50, and a third segment 3c of the data frame 3 to the sixth station 60.

To ensure that the message E to be transmitted by the second station 20 arrives at the central star coupler 1 at the time it is to be inserted into the fifth segment 3e of the data frame 3 generated by the first station 10, the second station must transmit its data information at the time T0–v20+e, where v20 is the propagation delay between the second station 20 and the central star coupler 1, and e is the relative position of the fifth segment 3e in the data frame.

Similarly, if the third station 30 wants to ensure that its message F is inserted into the associated fifth segment 3f of the data frame 3, it must transmit its message at a time T0–v30+f, where the variable v30 is the propagation delay between the third station 30 and the central star coupler 1, and f is again the relative position of the fifth segment 3f in the data frame 3.

From the above it is apparent to those skilled in the art that the fourth, fifth, and sixth stations 40, 50, and 60 must initiate the data transmission at the times T0–v0–v40, T0–v0–v50+b, and T0–v0–v60+c if it is to be ensured that the respective messages A, B, and C are written into the first, second, and third segments 3a, 3b, and 3c of the data frame 3. The variables v40, v50, and v60 denote the propagation delays from the fourth, fifth, and sixth stations 40, 50, and 60 to the secondary star coupler 2. The variable v0 then denotes the propagation delay between the secondary star coupler 2 and the primary star coupler 1. b and c are the relative positions of the segments 3b and 3c in the data frame 3.

It should be noted that from the stations 20–60 of the local operation network to the central star coupler 1, the data is transmitted without an explicit frame structure. This is indicated in FIG. 1 by the broken lines used to illustrate the data frames 3, which were drawn only for the sake of clarity and to show the relative positions of the messages A, B, C, E, and F.

The above measure ensures that the individual stations 10–60 of the local operation network transmit their data precisely at the time these data are present at the central star coupler 1 at the corresponding instant of insertion, taking into account the propagation delays between the respective sending station 10–60 and the central star coupler 1. Thus, the data frame 3 can be filled with the messages A–F of the individual stations 10–60 in a particularly simple manner, without any collisions occurring.

A data frame 3' filled with the messages A–F of the individual stations 10–60 is transmitted from the central star coupler 1 to all stations 10–60 of the local operation network. The frame structure predetermined by the first station 10 is identified by the stations via the frame mark bits SOF and EOF. The time-slot pattern determined by the time sequence of the received data frames 3' is defined as the frame receive clock of the receiving stations 10–60.

As can be seen in FIG. 1, the data frame 3' arrives at the fourth, fifth, and sixth stations 40–60 of the local operation network at the times T0+v0+v40, T0+v0+v50, and T0+v0+v60, respectively, and at the first, second, and third stations 10–30 at the times T0+v10, T0+v20, and T0+v30, respectively. Since the data frame 3' has an explicit frame structure, it is represented in FIG. 1 by continuous lines.

Figure 2:
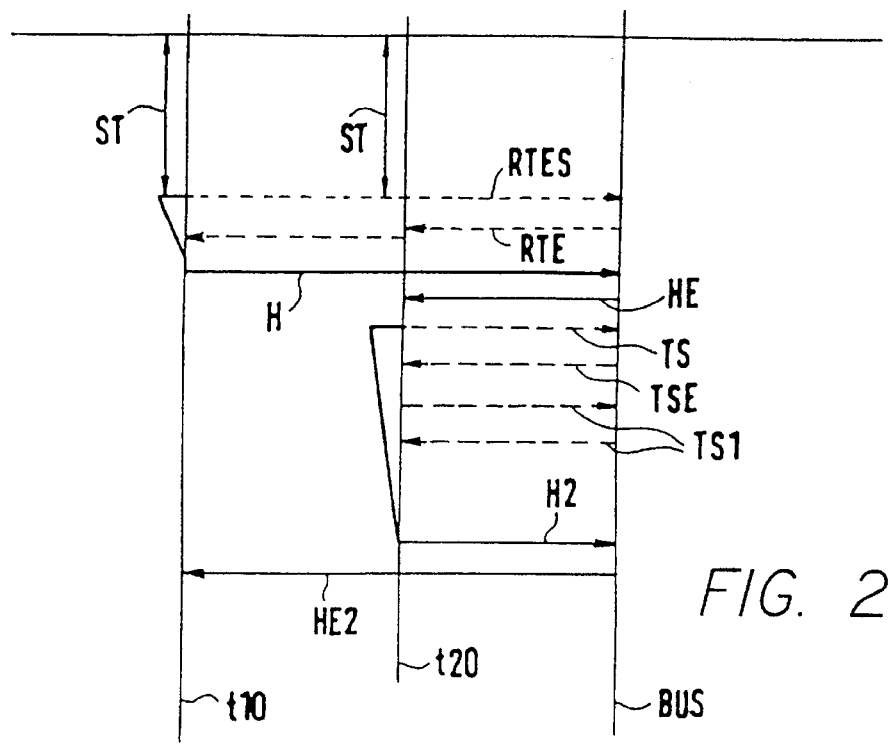
FIG. 2 is a schematic representation of the synchronization process of a station of the local operation network.

The above-described bus system will now be explained in greater detail with reference to FIGS. 2 to 4. FIG. 2 shows schematically the synchronization procedure for two stations 10 and 20 of the local operation network.

Before the synchronization procedure for the individual stations 10–60 of the local operation network is carried out, each of the stations 10–60 performs a self-test. This test must ensure that all electrical and optical components of the station are functioning properly. The performance of such a self-test as well as its hardware implementation are familiar to those skilled in the art, so that no further explanations are necessary at this point. This self-test ensures in an advantageous manner that only fully operational stations participate in the communication within the bus system of the local operation network. Thus, the bus system of the local operation network configures itself on each restart in an advantageous manner.

This self-test of the individual stations is indicated in FIG. 2 by the time duration ST on the vertical time axes t10 and t20, which show the time sequence of the individual synchronization steps of the stations 10 and 20.

The self-test of each of the stations 10–60 is time-supervised, i.e., each of the stations 10–60 which does not determine a positive conclusion of the self-test within the predetermined time period ST is excluded from the subsequent buildup of the bus system.

In the first step of the synchronization procedure proper, that station is fixed which acts as a frame clock generator, transmits the frame clock, and thus implicitly generates the reference frame clock. This task may be assigned to the hardware of a single station of the local operation network. This possibility is characterized by its particularly low-cost hardware implementation.

Particularly advantageously, however, the bus system of the local operation network is designed to be self-organizing, i.e., several or preferably all stations 10–60 are designed to be capable of performing the function of the frame clock generator. This dual-purpose design increases system reliability considerably, since in the event of a failure of one or more stations, the remaining stations of the local operation network are in a position to carry out the self-configuration and self-organization for the still operational portion of the local operation network.

To this end, a hierarchical sequence of the individual stations 10–60 is fixed within the network, such that a lower-level station will assume the function of the frame clock generator if it does not receive a frame clock mark bit from a higher-level station within a defined time interval.

In this embodiment, primarily the first station 10 acts as the frame clock generator. Subsidiarily, in the event of a failure of the first station 10, the second station 20 is to perform this function, etc.

In this first step of the synchronization process of the bus system, the first station 10 sends the data frames 3 and, thus, the frame-clock-determining frame mark bits SOF and EOF via the central star coupler 1 to the other stations 20–60 of the local operation network. This is indicated in FIG. 2 by a broken arrow RTS from the time axis t10 of the first station 10 to the line BUS at the right-hand margin of the figure, which symbolizes the bus of the local operation network. The reception of the frame mark bit by the second station 20 is indicated in FIG. 2 by the arrow RTE from the line BUS to the time axis t20 of the second station 20. The reception of the frame mark bits SOF and EOF by the second station 20 and by the other stations 30–60 stops these stations from assuming the function of the frame clock generator.

The first station 10 transmits a "hello" signal, which is indicated in FIG. 2 by the continuous arrow "H". The second station 20 receives the "hello" signal. This is indicated in FIG. 2 by the continuous arrow "HE" from the line BUS to the time axis t20 of the second station 20. This causes the second station 20 to synchronize, i.e., the second station 20 determines the propagation delay between it and the central star coupler 1. This propagation-delay determination will now be explained with reference to FIG. 2 and particularly to FIG. 3.

The second station 20 determines its frame receive clock RET (FIG. 3) from the frame mark bits SOF and EOF delimiting the data frame 3', and sends a test sequence TS relative to this frame receive clock RET to the central star coupler 1. This test sequence TS is inserted into the data frame 3 which is present there at that instant, and sent back to the second station 20 in the data frame 3'. This is indicated in FIG. 2 by the broken arrow TSE. The second station 20 now determines the propagation delay v20 from the time difference between the transmission and reception of the test sequence TS, and then shifts its frame transmit clock RST (FIG. 3) accordingly, so that a frame transmit clock RST20 (FIG. 3) synchronized with the reference frame clock is fixed.

Following these steps, i.e., after the end of its synchronization procedure, the second station 20 places a "hello 2" signal on the bus. This is indicated in FIG. 2 by the continuous arrow H2. This signal H2 is passed through the central star coupler 1 to the first station 1. This is indicated in FIG. 2 by the arrow H2. With the reception of the "hello 2" signal by the first station 10, the second station 20 has "logged on" in the bus system, and has thus been configured.

Additionally, provision may be made for the second station 20 to transmit a second test sequence TS1 (FIG. 2) and receive it again so as to be able to verify the first determination of the propagation delay v20 or repeat any erroneous or failed first determination. The first determination of the propagation delay v20 may fail particularly if frame mark bits SOF or EOF are superimposed on the test signal TS. In that case, an unambiguous determination is not possible for the second station 20. As mentioned above, the second station 20 transmits a second test sequence which is shifted in time so that it definitely lies between the frame mark bits SOF and EOF upon its arrival. Such a procedure is particularly advantageous in high-speed data networks since in such networks the exact determination of propagation delays and the delay compensation based thereon are of considerable importance for the correct operation of the local operation network.

The further steps for the synchronization of the whole bus system of the local operation network will now be explained with reference to FIG. 4. The steps performed in each station, which relate only to this station and the central star coupler 1, correspond to those described in connection with the synchronization of the second station 20, so that the description can be confined to the representation of the synchronization steps relating only to the overall system. In FIG. 4, the vertical lines t10, t20, t30, and t60 represent the time sequence of the system synchronization in the first, second, third, and sixth stations 10, 20, 30, and 60. The horizontal arrows indicate the signals exchanged for this purpose between the individual stations 10–60.

Figure 4:
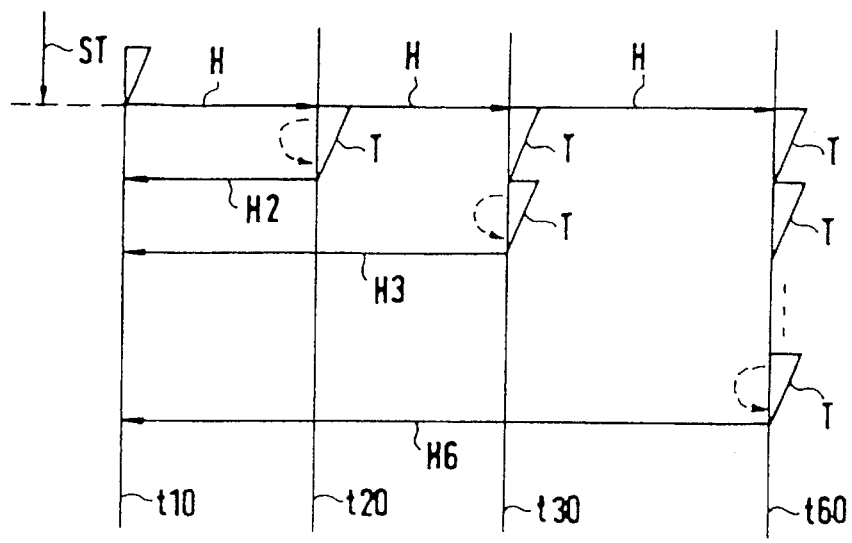
FIG. 4 is a schematic representation of the synchronization procedure for the whole local operation network.

The time axes t10–t60 of FIG. 4, which are associated with the stations 10–60, show—as already described—that during the first time period ST of the synchronization procedure the stations 10–60 perform their self-test, so that in the description of FIG. 4 it will be assumed that all stations shown, 10–60, are fully operational and, therefore, take part in the configuration of the local operation network. Also in this time period ST—as explained above—, the first station 10 is defined to be the "master station" acting as the frame clock generator, which sends the frame mark bits to the other stations 20–60. Also indicated in FIG. 4, by the arrows H, is the above-described transmission of the "hello" signal.

The arrival of a "hello" signal H at a station 30–60 causes a timer to be started. After the lapse of the time interval T fixed by the timer, the respective station begins its synchronization procedure. The number of timer starts between the "hello" signal H, which is sent out by the station 10, and the start of the synchronization procedure of a particular station varies from station to station. As a result of this time grading of the individual synchronization procedures, the station messages indicating the successful conclusion of the synchronization procedure do not overlap. As can be seen in FIG. 4, the second station, immediately after receiving the "hello" signal H from the first station, carries out its synchronization procedure in the time interval T and, at the end of this interval, transmits its station identification H to the first station. The third station 30 begins its synchronization procedure—symbolized in FIG. 4 by a broken circular arrow—only after the end of the first time interval T and, accordingly, carries out this synchronization procedure during a subsequent second time interval T. Consequently, the sixth and, thus, last station 60 of the local operation network waits five timer starts, each of the time duration T, and begins its synchronization procedure in the sixth time interval T. After the end of this procedure, it sends a "hello 6" signal (indicated in FIG. 4 by the arrow H6) to the first station 10.

The above description of the bus system of the local operation network and the network synchronization is independent of the specific internal structure of the data frame 3 used. It is particularly advantageous, however, to use a data frame 3 which has a synchronous frame module for synchronous services to be switched and an asynchronous frame module for asynchronous services to be switched, with the division of the data frame 3, caused by a division module generated by the first station 10, being dynamically variable. Through this data-frame structure it is then possible in a particularly advantageous manner to transmit both synchronous and asynchronous services in a single data frame, whereby the bus system becomes universally applicable.

Such a modular structure of a data frame will now be described.

FIG. 5 shows an embodiment of a data frame 3 for a frame-structured bus system, which has a fixed frame duration of T seconds. Each data frame 3 consists of five modules. A start module SOF at the beginning of each data frame 3 marks the beginning of each frame.

The start module SOF is followed by an isochronous frame module CFM, which serves to transmit the isochronous services. The isochronous frame module CFM is followed by a division module DOM, which is followed by an asynchronous frame module PFM serving to transmit the asynchronous services.

The division module DOM, which serves to separate the isochronous frame module CFM from the asynchronous frame module PFM, does not occupy a fixed position within the data frame 3 of the frame-structured bus system but is dynamically shiftable within each data frame 3, so that an individual and variable division of each data frame 3 of the frame-structured bus system is possible.

An end module EOF at the end of each data frame 3 signals the end of the data frame 3. It is also possible, however, to dispense with the start module SOF and use only the end module EOF to mark the beginning and end of a data frame, in which case the end module EOF signals both the end of a data frame and the beginning of the next data frame.

A particularly important aspect is that the combination of the isochronous frame module CFM and the asynchronous frame module PFM within a single data frame 3 permits a particularly advantageous integration of isochronous and asynchronous services within a single data frame and, thus, within a single frame-structured bus system. The dynamic variation of the shares of the asynchronous and isochronous frame modules PFM, CFM in each data frame 3 makes it possible in a particularly simple manner to flexibly respond to the current data volume and to modify the frame-module structure in such a way that optimum utilization of the available transmission capacity is achieved. With such a data frame 3 having a flexible frame-module structure, it is thus readily possible to transmit asynchronous services alone or both asynchronous and isochronous services or isochronous services alone.

In the above-described data frame 3, first the isochronous frame module CFM and then—separated by the division module DOM—the asynchronous frame module PFM are transmitted. It is also possible, however, to reverse this order, i.e., to transmit first the asynchronous frame module PFM and then the isochronous frame module CFM. The division module DOM may also be located before the asynchronous and isochronous frame modules PFM, CFM in the data frame 3 and, acting as a pointer, contain information on the positions of these two frame modules CFM, PFM. What is important is that the dynamically shiftable division module DOM—whose position is determined via asynchronous signalling procedures—unambiguously defines the exact succession of the isochronous and asynchronous frame modules CFM, PFM in the data frame 3.

To permit the five individual modules of a data frame 3 to be identified in a particularly simple manner, the start module SOF, the end module EOF, and the division module DOM have a defined bit structure of a fixed length which does not occur in the data to be transmitted.

Another possibility for the implementation of the aforementioned modules is the realization of code violations in a line code.

The structure of a frame module for isochronous services (isochronous frame module CFM) is shown in FIG. 6. The bit length of the isochronous frame module CFM, defined by the distance between start module SOF and division module DOM, is always an integral multiple of a basic channel K1, ..., KAS, where AS denotes the number of basic channels of the respective isochronous frame module CFM of a given data frame 3. Each basic channel K1–KAS is at least 1 bit long and preferably contains a given number of octets AOPK, so that by concatenating a plurality of basic channels which are then jointly assigned to at least one given bus station, the isochronous transmission of a given bit rate is ensured.

The asynchronous frame module PFM, shown in FIG. 7, is defined, analogously to the isochronous frame module CFM, by the distance in bits between the division module DOM and the end module EOF. An advantage is that an arbitrary asynchronous access method can be used to access the data contained in the asynchronous frame module PFM. Such access methods were already described at the beginning and are familiar to those skilled in the art, so that no further explanation is needed at this point.

The asynchronous frame module PFM of FIG. 7 is designed for use with a token access method. It is subdivided into a number of submodules S1–S3 equal to the number of bus stations of the frame-structured bus system which transmit asynchronous services and access the data bus in the respective asynchronous frame module PFM of the data frame 3. Of the submodules S1–S3 of the asynchronous frame module PFM, only the second submodule S2 is shown for the sake of clarity. The structure of the first and third submodules S1–S3 is identical with the structure of the second submodule S2. It should be noted that a time slot GP is provided between the individual submodules S1–S3 which is not assigned to any of the asynchronous bus stations. These time slots GP serve to process the tokens within the bus stations of the frame-structured bus system.

A start flag SOM at the beginning of the submodule S2 is followed by a message module M. The message module M is followed by a token flag TF which determines the next station that can place its data on the data bus in the following submodule. An end flag EOM terminates the submodule.

The message module M is shown in FIG. 8. It includes a message-type flag MT and a message-length flag ML which indicate its beginning. These two flags MT and ML are followed by the message module proper, D, in which the data of the bus station are placed on the bus. A check field EC terminates the message module M. This check field EC serves to check whether the data contained in the message module proper, D, is being transmitted correctly.

Figure 9:
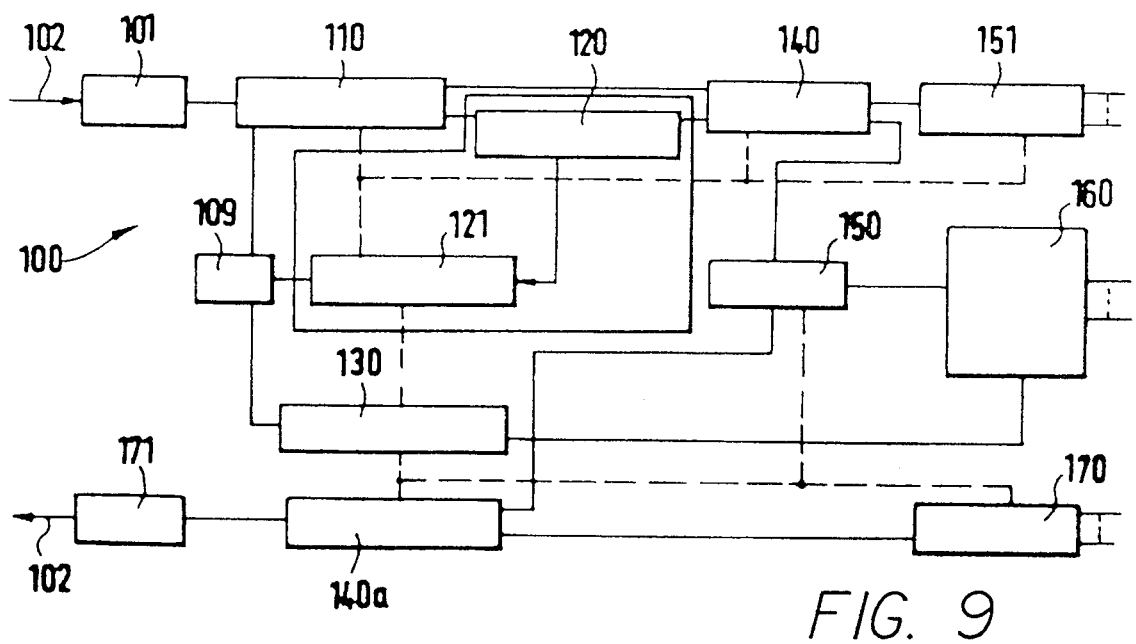
FIG. 9 is a block diagram of the transmit/receive section of a station.

FIG. 9 shows a transmit-receive section 100 of a station which is especially suited for use with the above-described bus system for a local operation network. The transmit/receive section includes an O/E transducer 101 which serves to convert the optical data signals received via the glass fiber 102 into electric signals. The O/E transducer 101 is followed by a synchronizing circuit 110 which is clocked by an oscillator 109 and determines the frame receive clock or checks this clock during operation.

The synchronizing circuit 110 is connected to a functional block 120 which serves to determine the propagation delay and, thus, the necessary delay of the frame transmit clock with respect to the reference frame clock. In the manner already described above in detail, the functional block 120 determines the signal delay to the central star coupler 1 by determining the time difference between the transmission and reception of the test signal TS (FIGS. 2 and 3), and controls a delay element 121 accordingly, which is clocked by an oscillator 109. The delay element 121 cooperates with a frame-structure generator/monitor 130 which is clocked by the oscillator 109 and generates the frame mark bits SOF and EOF.

Also connected to the synchronizing circuit 110 is a module selector 140 which performs the division of the received data frame 3' into the synchronous and asynchronous frame modules. The module selector 140 is connected to a demultiplexer 151 which acts as an interface to the information sources or sinks connected to the stations.

The module selector 140 is also connected to a microprocessor-controlled access controller 150 which controls the reception of the asynchronous frame module in conjunction with the module selector 140 and the transmission of the asynchronous frame module in conjunction with a further module selector 140a. The microprocessor 160 also controls the frame-structure generator/monitor 130 for generating the frame structure.

A multiplexer 170 serves as a further interface to the information sources/sinks of the station. An E/O transducer 171 converts the electric signals of the transmit/receive section into optical signals, which can propagate in the local operation network.

We claim:

1. A local operation network having a number of stations each connected by a bus line to a central star coupler, wherein each message sent out by a respective sending station is transmitted via the central star coupler to all stations of the local operation network, at least one of said stations is a master station including a frame clock generator for generating a master frame clock in the form of a sequence of data frames of a predefined bit length, each said data frame including a start module followed by an isochronous frame module having a variable first bit length, an end module preceded by an asynchronous frame module having a variable second bit length, and a division module between the isochronous frame module and the asynchronous frame module, said master frame clock is transmitted from said master station to the central star coupler, in the central star coupler, the time sequence of the data frames of the master frame clock defines a reference frame clock governing the signal processing of the stations of the local operation network, each of the stations of the local operation network determines a respective propagation delay from that station to the central star coupler and uses that propagation delay to generate an individual frame transmit clock, such that each message transmitted by said respective sending station arrives at the central star coupler at the latter at a respective assigned instant of the reference frame clock at which that message must be incorporated into a current data frame then present in the central star coupler, and the current data frame containing messages from a plurality of the sending stations is sent to all stations, each of a plurality of asynchronous submodules is assigned to a respective bus station, isochronous data is transmitted at the beginning of each frame during said isochronous frame module, the plurality of asynchronous submodules are transmitted at the end of each frame within said asynchronous frame module, and said division module is transmitted by said master station at different respective locations within two successive frames, thereby dynamically establishing said variable first and second bit lengths for each of the frames.

2. A local operation network as claimed in claim 1, wherein the determination of the propagation delay between each of the stations and the central star coupler is made dynamically at least at each start-up of the local operation network, and the frame transmit clock of the station is shifted by the determined propagation delay with respect to the frame receive clock.

3. A local operation network as claimed in claim 2, wherein to determine the propagation delay, each of the stations sends a test signal to the central star coupler, said test signal is sent back to the sending station in the transmitted data frame, and the sending station determines the propagation delay from the time difference between the transmission and arrival of the test signal.

4. A local operation network as claimed in claim 1, wherein the messages of the individual stations are inserted into the data frame sequentially.

5. A local operation network as claimed in claim 1, wherein at least at each start-up of the local operation network, each of the stations performs a self-test to check its individual components.

6. A local operation network as claimed in claim 5, wherein if the self-test is not positively concluded within a predetermined time period, that station is excluded from the local operation network.

7. A local operation network as claimed in claim 1, wherein
by the arrival in the central star coupler of the start module indicating the beginning of a data frame, a reference time is fixed.

8. A local operation network as claimed in claim 1, wherein
the division module is generated in the frame clock generator.

9. A local operation network as claimed in claim 1, wherein
the function of the frame clock generator is assigned to a particular station of the local operation network.

10. A local operation network as claimed in claim 9, wherein
the station assuming the function of the frame clock generator sends a signal to the other stations of the local operation network which inhibits said other stations from assuming said frame clock generator function.

11. A local operation network as claimed in claim 9, wherein
the station acting as a frame clock generator sends a signal to the other stations which causes a timer to start in said other stations, and
after the lapse of a station-specific time interval fixed by the timer, said other stations carry out the determination of their frame transmit clock.

12. A local operation network as claimed in claim 11, wherein
after the end of their synchronization procedure, the other stations send a station identification to the station acting as a frame clock generator.

13. A local operation network as claimed in claim 1, wherein
upon start-up or in the event of a reconfiguration after a failure, the function of the frame clock generator can be assumed by at least one other station, with a hierarchical sequence of the individual stations being fixed within the network, such that a low-level station will assume the function of the frame clock generator if it does not receive a frame clock mark bit from a higher-level station within a defined time interval.

14. A local operation network as claimed in claim 13, wherein
all stations of the local operation network can assume the function of the frame clock generator.

15. A local operation network as claimed in claim 1, wherein
at least one station of the local operation network is connected to the central star coupler via at least one secondary star coupler.

16. A local operation network as claimed in claim 15, wherein
each station comprises a transmit/receive section which includes a functional block for determining the propagation delay.

17. A local operation network as claimed in claim 16, wherein
the functional block comprises a delay element cooperating with a frame-structure generator/monitor.

18. A local operation network as claimed in claim 16, wherein
the transmit/receive section comprises a first E/O transducer and a second E/O transducer.

19. A local operation network as claimed in claim 16, wherein
the transmit/receive section includes a multiplexer and a demultiplexer.

20. A local operation network as claimed in claim 15, wherein
at least one station of the local operation network is designed as a multiplexer/demultiplexer.

* * * * *